United States Patent Office 3,235,421
Patented Feb. 15, 1966

3,235,421
TERPOLYMER OF BUTADIENE, ACRYLIC ACID AND ALKYLFLUOROACRYLATES, AS BURNING RATE MODIFIERS
Morris B. Berenbaum and Ray C. Christena, Levittown, Pa., assignors to Thiokol Chemical Corporation, Bristol, Pa., a corporation of Delaware
No Drawing. Filed Feb. 6, 1962, Ser. No. 172,058
16 Claims. (Cl. 149—19)

This invention relates to novel curable terpolymers of butadiene, acrylic acid and certain alkyl fluoroacrylate materials, and to the novel propellant binder-burning rate accelerator cure products formed therefrom.

Controlled acceleration of burning rates is a desirable object sought by practitioners of the solid propellant arts. Known accelerators are particulate solids which are usually admixed with curable liquid ploymer propellant binders, particulate oxidizers and oxidizable metals. Admixed particulate accelerators, however, impose several substantial processing problems in the formation of a physically uniform propellant mix. They are held in suspension in the fluid propellant mix prior to cure, and upon cure of the propellant binder they are present, at best, as a fairly uniform dispersion in the binder matrix. Concentration gradients may form prior to cure where one part of the mix becomes richer in accelerator particles than another due to settling or other reasons and will produce variations in burning rate during combustion. A concomitant reduction in performance reliability of rocket motors fabricated from such mixes is produced thereby.

It is an object of this invention to provide novel curable liquid terpolymers which act both as propellant binders and burning rate accelerators.

Another object of this invention is to provide novel propellant binder and burning rate accelerator compositions which afford no concentration gradient of burning rate accelerator components in propellant mixes formed therewith.

These objects and others inherent in the following description are satisfied by the present novel and curable liquid terpolymers of butadiene, acrylic acid, and certain alkylfluoroacrylate mterials, and by their novel cure products.

It has been unexpectedly found that novel liquid terpolymers of butadiene, acrylic acid and certain alkylfluoroacrylate materials when cured as binders in propellant compositions provide upon combustion accelerated burning rates over propellant compositions employing similarly curable copolymers containing just butadiene and acrylic acid. It has further been unexpectedly found that the use of the novel terpolymers of the present invention eliminates the occurence of possible concentration gradients in propellant mixes of the burning rate accelerator component.

The present terpolymers are obtained through free radical polymerization of monomeric butadiene, acrylic acid and alkylfluoroacrylate materials having the structure

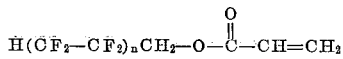

where $n=2$ to 4; where $n$ is 2, the octafluoropentyl acrylate material has a boiling point of 56° C. at 8 mm. and a refractive index $(n_D^{25°\ C.})$ of 1.3456 at 15° C.; where $n$ is 3, the dodecafluoroheptyl acrylate material has a boiling point of 87° C. at 10 mm., a refractive index $(n_D^{25°\ C.})$ of 1.3412 at 25° C. and a specific gravity of 1.596 $(d_4°^{26°})$; where $n$ is 4, the hexadecafluoro-nonyl-acrylate has a boiling point of 88° C. at 1.3 mm., a refractive index $(n_D^{25°\ C.})$ of 1.3361 at 30° C. and a specific gravity of 1.650 $(d_4°^{26°})$.

Butadiene imparts rubbery characteristics to the cured product, while acrylic acid is present to provide active carboxyl groups as cure sites on the terpolymer molecules. The akyl fluoro acrylate material provides burning rate acceleration properties to the terpolymer and the cured product. Butadiene units, acrylic acid units and the alkyl fluoro acrylate units may be present in terpolymers of this invention in mole percentages of 93 to 98%, 1 to 5% and 0.5 to 5%, respectively.

Terpolymers of this invention are curable liquids having a viscosity between 100 and 600 poises at 23° C., and a carboxyl content of about at least 0.03 carboxyl equivalent weights per 100 g. of terpolymer. Where the viscosity of the terpolymer is much below 100 poises the propellant mix formed therewith is found to be too fluid, permitting settling of particulate solid mix components such as oxidizer particles prior to the time of cure; where the viscosity is much above 600 poises the propellant mix formed therewith is found to be far too stiff to permit facile processing and where the carboxyl content of the terpolymer is much below 0.03 equivalent per 100 g. of terpolymer it is found that the cured binder product produced therewith does not have mechanical strength and elastomeric resilience properties required of a good propellant binder.

The present terpolymers are cured under heat treatment by polyepoxides, polyimines and other agents which have two or more functional groups per molecule that are capable of reacting with active carboxyl sites present on the terpolymer molecules to thereby link these molecules together in a crosslinking operation and form a soft resilient and elastomeric solid. The solids formed upon such cure are novel propellant binder compositions. Prominent among the curing agents which are effective in the practice of this invention are epoxide materials having two or more reactive epoxide, viz.

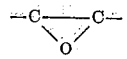

sites per molecule and an epoxide equivalent of at least 100, and also those imine materials having two or more reactive imine, viz.

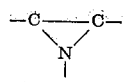

sites per molecule.

Many commercially available polyepoxide and polyimine cure agents are suitable to present use, and include among the polyepoxides epichlorohydrinbis-phenol A type products, such as Tipox A, Tipox B, Tipox C and Tipox E, marketed by Thiokol Chemical Corporation, and ERL 2795, marketed by Union Carbide Corporation, and Epon 828 available from Shell Chemical Company. Commercial polyimines found useful in the cure of the present inventions terpolymers include tris 1-(2-methyl)azridinyl phosphine oxide (MAPO).

The effective ratios of carboxyl equivalents to epoxy equivalents found to be useful in the present cure processes are 1/0.5 up to 1/1.5, and preferably 1/0.7; ratios of carboxyl equivalents to imine equivalents useful in the cure of the terpolymers of the present invention are 1/0.5 up to 1/1.5, and preferably 1/0.9.

Heat treatment of the terpolymers and cure agents is conducted according to the practice of the present invention in the range of 120 to 150° F., and preferably at 130–140° F. Cure at these temperatures proceeds slowly, and it is usual to have cure times extend from 24 to 72 hours, the optimum time of cure for any specific composition being dependent upon several factors including the carboxyl content of the terpolymer, the desired temperature of cure, the nature of the curing agent used, and the degree of loading and type of oxidizer and other additives used.

Cure products of the present invention are in general soft elastomeric solids, and are eminently suited to act both as propellant binders and burning rate accelerators. Specific advantages afforded by these novel cure products include an ability to provide greater loadings of oxidizer and oxidizable metals particles in propellant mixes formulated therewith than is possible with other binder systems which require the addition of particulate burning rate modifier additives. A further advantage lies in the uniform dispersion of the burning rate modifier component in the present compositions, namely the alkyl fluoro acrylate materials throughout the polymeric binder system without special mixing or other precautions; yet another advantage imparted is the elimination of one particulate component formerly necessary in mix formulations, namely prior art particulate burning rate accelerators.

The following examples are merely illustrative of the present invention and are not intended as a limitation upon the scope thereof.

*Example 1*

In this example a curable terpolymer of butadiene, acrylic acid and dodecafluoroheptyl acrylate, designated terpolymer T-1, was prepared having a viscosity of 505 poises at 80° F., a carboxyl content of 0.032 equivalent per 100 g. of terpolymer and fluorine content of 8.57%.

Three hundred and twenty-four grams of 1,3-butadiene, 3.74 g. of acrylic acid, 61.2 g. of dodecafluoroheptyl acrylate, 3 ml. of tert-dodecyl mercaptan and 5 g. of benzoyl peroxide were charged to an enclosed stainless steel reactor. The latter was placed in a rotating constant temperature bath set at 80° C. At the end of 16 hours, 5.3 g. of acrylic acid, 3 ml. of tert-dodecyl mercaptan and 5 g. of benzoyl peroxide were charged to the reactor. At the end of 32 hours an additional 6.94 g. of acrylic acid, 3 ml. of tert-dodecyl mercaptan and 5 g. of benzoyl peroxide were charged. The polymerization was continued at 80° C. for a total of 48 hours, at the end of which time the monomer-polymer mixture was poured into an open beaker to permit evaporation of excess butadiene present. The polymer was washed twice with tap water, twice with methanol, then was dissolved in toluene, filtered to remove solids and dried to a constant weight under vacuum at 50° C. Twenty grams of the polymer product, 2 g. of the polyepoxide ERL 2795 marketed by Union Carbide, and 0.2 g. of the polyamine 1,3,5-(dimethylaminomethyl phenol) were blended, placed in an aluminum cup and cured at 70° C. for 16 hours to produce a resilient rubber with good elastomeric properties. Similarly, terpolymers are made from 1,3-butadiene, acrylic acid and octofluoropentyl acrylate as disclosed above.

*Example 2*

In this example another curable terpolymer of butadiene, acrylic acid and dodecafluoroheptyl acrylate, disignated as terpolymer T-2, was prepared and had a viscosity of 247 poises at 80° F., a carboxyl content of 0.074 equivalents per 100 g. terpolymer, and a fluorine content of 9% by weight.

91.5 lbs. of 1,3-butadiene were charged to a closed steel reactor. (Step A): 1.13 lbs. of azobisisobutyronitrile, 0.711 lb. of tert-dodecylmercaptan and 4.47 lbs. of acetone were premixed and then charged to the reactor, together with an additional 0.87 lb. of acetone used to flush the feed lines. (Step B): 4.23 lbs. of acrylic acid and 6.49 lbs. of dodecafluoroheptyl acrylate were premixed and then charged to the reactor. A further 0.87 lb. of acetone was used to flush the feed lines and added to the charge. (Step C): The reactor was sealed, heated to and maintained at about 175° F. for 8 hours with agitation. Steps A, B and C were then repeated twice. At the end of 24 hours, the reaction mass was cooled to about 90° F., washed three times with methanol, and dried to a constant weight. The pot product, terpolymer T-2, was then used as is.

*Example 3*

In this example a curable terpolymer of butadiene, acrylic acid and hexadecafluorononyl acrylate, designated, terpolymer T-3 was prepared having a viscosity of 525 poises at 80° F., fluorine content of 6%, and a carboxyl equivalent content of 0.031/100 g. terpolymer.

324 g. of 1,3-butadiene, 5.33 g. of acrylic acid, 39 g. of hexadecafluorononyl acrylate, 3 ml. of tert-dodecyl mercaptan and 5 g. of benzoyl peroxide were charged to an enclosed stainless steel reactor. The latter was placed in a rotating constant temperature bath set at 80° C. At the end of 16 hours 5.33 g. of acrylic acid, 3 ml. of tert-dodecyl mercaptan and 5 g. of benzoyl peroxide were charged to the reactor. At the end of 32 hours an additional 5.33 g. of acrylic acid, 3 ml. of tert-dodecyl mercaptan and 5 g. of benzoyl peroxide were charged. The polymerization was continued at 80° C. for a total of 48 hours, at the end of which time the monomer-polymer mixture was poured into an open beaker to permit evaporation of excess butadiene present. The polymer was washed twice with tap water, twice with methanol, then was dissolved in toluene and dried to a constant weight under vacuum at 50° C.

*Example 4*

In this example a curable terpolymer of butadiene, acrylic acid and hexadecafluorononyl acrylate, designated terpolymer T-4, was prepared having a viscosity of 165 poises at 80° F. a carboxyl content of 0.044 equivalents per 100 g. of terpolymer, a fluorine content of 6.2%, a carbon content of 81.24% and an hydrogen content of 10.49%.

324 g. of 1,3-butadiene, 10.6 g. of acrylic acid, 120 g. of hexadecafluorononyl acrylate, 5 ml. of tert-dodecyl mercaptan and 4 g. of azobisisobutyronitrile were charged to an enclosed stainless steel reactor. The latter was placed in a rotating constant temperature bath set at 80° C. At the end of 16 hours 10.6 g. of acrylic acid, 4 ml. of tert-dodecyl mercaptan and 4 g. of azobisisobutyronitrile were charged to the reactor. At the end of 32 hours an additional 10.6 g. of acrylic acid, 3 ml. of tert-dodecyl mercaptan and 4 g. of azobisisobutyronitrile were charged. The polymerization was continued at 80° C. for a total of 48 hours, at the end of which time the monomer-polymer mixture was poured into an open beaker to permit evaporation of excess butadiene present. The polymer was washed with methanol, then was dissolved in toluene, filtered to remove solids and dried to a constant weight under vacuum at 50° C.

*Example 5*

In this example comparison is made between the strand and motor burning rates of two propellants, one using as binder a 95.7/4.3 weight ratio copolymer of butadiene/acrylic acid, designated hereafter as copolymer BA, and the other using as binder the terpolymer T-2, prepared as in Example 2. In all other respects the propellant compositions are identical. Cure was effected in 64 hours at 135° F. The burning rates, $R_b$, are expressed in inches/sec. at a chamber pressure of 1,000 p.s.i.

| Formulation ingredient or property | Quantity | |
|---|---|---|
| | Propellant control | Propellant T-2 |
| Ammonium perchlorate (coarse, about 190 u.), p.b.w | 52 | 52 |
| Ammonium perchlorate (fine, about 12 u.), p.b.w | 17 | 17 |
| Aluminum powder (12-15 u.), p.b.w | 14 | 14 |
| BA copolymer, p.b.w | 15.3 | |
| T-2 terpolymer, p.b.w | | 15.3 |
| MAPO, p.b.w | 0.7 | 0.7 |
| $R_b$, in./sec. at 1,000 p.s.i. (strand data) | 0.26 | 0.30 |
| $R_b$, in./sec. at 1,000 p.s.i. (motor data) | 0.275 | 0.313 |

Modified burning rates may also be obtained by using the terpolymer products of Examples 3 and 4 as well as terpolymers of butadiene, acrylic acid and octofluoropentyl acrylate.

Example 6

In this example, comparison is made between strand burning rates of two propellants one using the copolymer BA and the other the terpolymer in another mix formulation. Cure was effected in 64 hours at 135° F.

| Formulation ingredient or property | Quantity | |
| --- | --- | --- |
| | Propellant control | Propellant T-2 |
| Ammonium perchlorate (coarse, about 190 u.), p.b.w. | 57.2 | 57.2 |
| Ammonium perchlorate (fine, about 12 u.), p.b.w. | 11.7 | 11.7 |
| Aluminum powder (12-15 u.), p.b.w. | 13.0 | 13.0 |
| BA copolymer, p.b.w. | 13.7 | |
| T-2 terpolymer, p.b.w. | | 13.7 |
| Epi-Rez 510 (an epoxy resin marketed by Jones-Dabney, which is an epichlorohydrin/Bisphenol A type material and has an epoxy equivalent of about 180-200), p.b.w. | 4.3 | 4.3 |
| $R_b$, in./sec. at 1,000 p.s.i. | 0.30 | 0.41 |

We claim:

1. A terpolymer of butadiene, acrylic acid and an alkyl fluoro acrylate having the structure

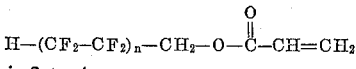

in which $n$ is 2 to 4.

2. A terpolymer as in claim 1 in which said alkyl fluoro acrylate is octofluoropentyl acrylate.
3. A terpolymer as in claim 1 in which said alkyl fluoro acrylate is dodecafluoroheptyl acrylate.
4. A terpolymer as in claim 1 in which said alkyl fluoro acrylate is hexadecafluoro nonyl acrylate.
5. A process for accelerating the burning rate properties of polymers formed from butadiene and acrylic acid which comprises terpolymerizing with said butadiene and acrylic acid alkyl fluoroacrylate materials having the structure

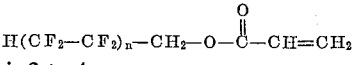

in which $n$ is 2 to 4.

6. A process as in claim 5 in which $n$ is 2.
7. A process as in claim 5 in which $n$ is 3.
8. A process as in claim 5 in which $n$ is 4.
9. A propellant composition comprising, as the binder therefor, a terpolymer of butadiene, acrylic acid and an alkyl fluoro acrylate having the structure

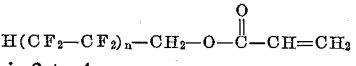

in which $n$ is 2 to 4.

10. A composition as in claim 9 in which $n$ is 2.
11. A composition as in claim 9 in which $n$ is 3.
12. A composition as in claim 9 in which $n$ is 4.
13. A liquid, curable terpolymer consisting of 93 to 98 mol percent of butadiene units, 1 to 5 mol percent of acrylic acid units and 0.5 to 5 mol percent of alkyl fluoro acrylate units wherein the acrylate has the structure $$H(CF_2-CF_2)_n-CH_2-O-\overset{O}{\underset{\|}{C}}-CH=CH_2$$

in which $n$ is 2 to 4.

14. A terpolymer as in claim 13 in which $n$ is 2.
15. A terpolymer as in claim 13 in which $n$ is 3.
16. A terpolymer as in claim 13 in which $n$ is 4.

References Cited by the Examiner

UNITED STATES PATENTS

| 2,394,406 | 2/1946 | Schoenfeld | 260—80.7 |
| 2,628,958 | 2/1953 | Brittles | 260—89.5 |
| 2,642,416 | 6/1953 | Ahlbrecht et al. | 260—80.7 |

CARL D. QUARFORTH, *Primary Examiner.*

LEON D. ROSDOL, *Examiner.*